US008323481B2

(12) United States Patent
Dana et al.

(10) Patent No.: US 8,323,481 B2
(45) Date of Patent: Dec. 4, 2012

(54) CARBON MANAGEMENT AND SEQUESTRATION FROM ENCAPSULATED CONTROL INFRASTRUCTURES

(75) Inventors: Todd Dana, Park City, UT (US); James W. Patten, Sandy, UT (US)

(73) Assignee: Red Leaf Resources, Inc., Sandy, UT (US)

( * ) Notice: Subject to any disclaimer, the term of this patent is extended or adjusted under 35 U.S.C. 154(b) by 169 days.

(21) Appl. No.: 12/701,156

(22) Filed: Feb. 5, 2010

(65) Prior Publication Data
US 2010/0200465 A1 Aug. 12, 2010

Related U.S. Application Data

(60) Provisional application No. 61/152,220, filed on Feb. 12, 2009.

(51) Int. Cl.
*C10G 1/04* (2006.01)

(52) U.S. Cl. ......... 208/400; 196/14.52; 196/46; 208/45; 208/87; 208/96; 208/311; 423/27; 423/49; 423/53; 423/68; 423/109; 423/139; 423/150.1; 422/261; 201/30; 201/36; 201/37; 201/38; 201/40; 34/518; 202/88; 202/262; 48/201; 48/203; 48/209; 48/210

(58) Field of Classification Search ............... 196/14.52, 196/46; 208/45, 50, 53–54, 87, 96, 128–132, 208/311, 322–337, 400–403; 422/261; 34/518; 202/88, 262, 210–226; 48/201, 203, 209–210; 423/27, 49, 53, 68, 109, 139, 150.1

See application file for complete search history.

(56) References Cited

U.S. PATENT DOCUMENTS

| | | | |
|---|---|---|---|
| 1,919,636 A | 7/1933 | Karrick | |
| 2,481,051 A | 9/1949 | Uren | |
| 3,617,471 A | 11/1971 | Schlinger et al. | |
| 3,652,447 A | 3/1972 | Yant et al. | |
| 3,661,423 A | 5/1972 | Garrett | |
| 3,910,834 A | 10/1975 | Anderson | |
| 3,919,390 A * | 11/1975 | Moore | 423/210.5 |
| 3,954,140 A | 5/1976 | Hendrick | |

(Continued)

FOREIGN PATENT DOCUMENTS

JP 2005-306721 11/2005

(Continued)

OTHER PUBLICATIONS

U.S. Appl. No. 12/703,560, filed Feb. 10, 2010; Todd Dana; Office action issued Nov. 18, 2011.

(Continued)

*Primary Examiner* — Brian McCaig
(74) *Attorney, Agent, or Firm* — Thorpe North & Western LLP

(57) ABSTRACT

A method of sequestering carbon dioxide emissions during recovery of hydrocarbons from hydrocarbonaceous materials can include forming a constructed permeability control infrastructure. This constructed infrastructure defines a substantially encapsulated volume. A comminuted hydrocarbonaceous material can be introduced into the control infrastructure to form a permeable body of hydrocarbonaceous material. The permeable body can be heated sufficient to remove hydrocarbons therefrom. During heating, the hydrocarbonaceous material is substantially stationary as the constructed infrastructure is a fixed structure. Additionally, during heating, any carbon dioxide that is produced can be sequestered. Removed hydrocarbons can be collected for further processing, use in the process, and/or use as recovered.

12 Claims, 5 Drawing Sheets

U.S. PATENT DOCUMENTS

| | | | |
|---|---|---|---|
| 4,017,119 | A | 4/1977 | Lewis |
| 4,029,571 | A | 6/1977 | Curtin |
| 4,043,595 | A | 8/1977 | French |
| 4,096,912 | A | 6/1978 | Lewis et al. |
| 4,106,814 | A | 8/1978 | French |
| 4,133,580 | A | 1/1979 | French |
| 4,151,068 | A | 4/1979 | McCollum et al. |
| 4,155,967 | A | 5/1979 | South et al. |
| 4,158,622 | A | 6/1979 | Schwarzenbek |
| 4,171,146 | A | 10/1979 | Hard |
| 4,199,327 | A * | 4/1980 | Hempill et al. ............. 48/202 |
| 4,219,237 | A | 8/1980 | Sisemore |
| 4,221,648 | A | 9/1980 | Martin |
| 4,234,230 | A | 11/1980 | Weichman |
| 4,241,952 | A | 12/1980 | Ginsburgh |
| 4,266,612 | A | 5/1981 | French |
| 4,266,826 | A | 5/1981 | French |
| 4,294,563 | A | 10/1981 | Kilburn |
| 4,303,533 | A | 12/1981 | Fremont |
| 4,353,418 | A | 10/1982 | Hoekstra et al. |
| 4,376,107 | A | 3/1983 | Morgenthaler |
| 4,415,365 | A | 11/1983 | Spars et al. |
| 4,423,907 | A | 1/1984 | Ridley |
| 4,424,021 | A | 1/1984 | Merrill, Jr. |
| 4,430,195 | A | 2/1984 | Oltrogge |
| 4,440,446 | A | 4/1984 | Hutchins |
| 4,449,586 | A | 5/1984 | Urban et al. |
| 4,452,689 | A | 6/1984 | Russum |
| 4,454,915 | A | 6/1984 | York et al. |
| 4,502,920 | A | 3/1985 | Edwards |
| 4,851,134 | A | 7/1989 | Bennoit et al. |
| 4,879,019 | A | 11/1989 | Ward |
| 4,984,594 | A | 1/1991 | Vinegar et al. |
| 5,024,487 | A | 6/1991 | Woestemeyer et al. |
| 5,041,209 | A | 8/1991 | Cha et al. |
| 5,076,727 | A | 12/1991 | Johnson et al. |
| 5,114,497 | A | 5/1992 | Johnson et al. |
| 5,137,539 | A | 8/1992 | Bowling |
| 5,139,535 | A * | 8/1992 | Strickland et al. ............. 48/76 |
| 5,190,405 | A | 3/1993 | Vinegar et al. |
| 5,193,934 | A | 3/1993 | Johnson et al. |
| 5,221,827 | A | 6/1993 | Marsden et al. |
| 5,229,583 | A | 7/1993 | van Egmond et al. |
| 5,244,310 | A | 9/1993 | Johnson |
| 5,271,693 | A | 12/1993 | Johnson et al. |
| 5,318,116 | A | 6/1994 | Vinegar et al. |
| 5,340,467 | A | 8/1994 | Gregoli et al. |
| 5,372,621 | A | 12/1994 | Staton |
| 5,372,708 | A | 12/1994 | Gewertz |
| 5,478,443 | A | 12/1995 | Cogat |
| 5,543,041 | A | 8/1996 | Okazaki et al. |
| 5,553,189 | A | 9/1996 | Stegemeier et al. |
| 5,656,239 | A | 8/1997 | Stegemeier et al. |
| 5,660,500 | A | 8/1997 | Marsden, Jr. et al. |
| 5,674,424 | A | 10/1997 | Iben et al. |
| 5,843,214 | A | 12/1998 | Janes |
| 5,868,202 | A | 2/1999 | Hsu |
| 5,948,253 | A | 9/1999 | Hearn |
| 5,997,214 | A | 12/1999 | de Rouffignac et al. |
| 6,051,137 | A | 4/2000 | Deskins |
| 6,102,622 | A | 8/2000 | Vinegar et al. |
| 6,110,359 | A | 8/2000 | Davis et al. |
| 6,419,423 | B1 | 7/2002 | Vinegar et al. |
| 6,485,232 | B1 | 11/2002 | Vinegar et al. |
| 6,543,535 | B2 | 4/2003 | Converse et al. |
| 6,543,539 | B1 | 4/2003 | Vinegar et al. |
| 6,632,047 | B2 | 10/2003 | Vinegar et al. |
| 6,732,796 | B2 | 5/2004 | Vinegar et al. |
| 6,811,683 | B2 | 11/2004 | Davis et al. |
| 6,824,328 | B1 | 11/2004 | Vinegar et al. |
| 6,841,077 | B2 | 1/2005 | Gannon et al. |
| 6,854,929 | B2 | 2/2005 | Vinegar et al. |
| 6,875,356 | B2 | 4/2005 | Perriello |
| 6,881,009 | B2 | 4/2005 | Stegemeier et al. |
| 6,902,138 | B2 | 6/2005 | Vantouroux |
| 6,918,443 | B2 | 7/2005 | Wellington et al. |
| 6,923,257 | B2 | 8/2005 | Wellington et al. |
| 6,929,330 | B2 | 8/2005 | Drake et al. |
| 6,951,247 | B2 | 10/2005 | de Rouffignac et al. |
| 6,962,466 | B2 | 11/2005 | Vinegar et al. |
| 6,991,033 | B2 | 1/2006 | Wellington et al. |
| 7,004,247 | B2 | 2/2006 | Cole et al. |
| 7,004,251 | B2 | 2/2006 | Ward et al. |
| 7,004,678 | B2 | 2/2006 | Stegemeier et al. |
| 7,032,660 | B2 | 4/2006 | Vinegar et al. |
| 7,040,397 | B2 | 5/2006 | de Rouffignac et al. |
| 7,040,399 | B2 | 5/2006 | Wellington et al. |
| 7,048,051 | B2 | 5/2006 | McQueen |
| 7,051,811 | B2 | 5/2006 | de Rouffignac et al. |
| 7,066,254 | B2 | 6/2006 | Vinegar et al. |
| 7,070,758 | B2 | 7/2006 | Peterson |
| 7,073,578 | B2 | 7/2006 | Vinegar et al. |
| 7,077,198 | B2 | 7/2006 | Vinegar et al. |
| 7,077,199 | B2 | 7/2006 | Vinegar et al. |
| 7,090,013 | B2 | 8/2006 | Wellington |
| 7,091,460 | B2 | 8/2006 | Kinzer |
| 7,114,566 | B2 | 10/2006 | Vinegar et al. |
| 7,121,342 | B2 | 10/2006 | Vinegar et al. |
| 7,534,926 | B2 | 5/2009 | Stegemeier et al. |
| 7,862,705 | B2 | 1/2011 | Dana et al. |
| 7,862,706 | B2 | 1/2011 | Dana et al. |
| 2004/0211569 | A1 | 10/2004 | Vinegar et al. |
| 2006/0213657 | A1 | 9/2006 | Berchenko et al. |
| 2007/0000662 | A1 | 1/2007 | Symington et al. |
| 2007/0023186 | A1 | 2/2007 | Kaminsky et al. |
| 2008/0077430 | A1 | 3/2008 | Singer et al. |
| 2008/0190813 | A1 | 8/2008 | Dana |
| 2008/0190815 | A1 | 8/2008 | Dana |
| 2008/0190816 | A1 | 8/2008 | Dana |
| 2008/0190818 | A1 | 8/2008 | Dana |
| 2009/0007484 | A1 | 1/2009 | Smith |
| 2009/0250380 | A1 | 10/2009 | Dana |
| 2010/0200467 | A1 | 8/2010 | Dana |
| 2011/0138649 | A1 | 6/2011 | Patten |

FOREIGN PATENT DOCUMENTS

| | | |
|---|---|---|
| JP | 2009/090168 | 4/2009 |
| KR | 10-0595792 | 7/2006 |

OTHER PUBLICATIONS

U.S. Appl. No. 12/984,394, filed Jan. 4, 2011; Todd Dana; notice of allowance issued Oct. 26, 2011.
Alternative Methods for Fluid Delivery and Recovery; Manual; Sep. 1994; United States Environmental Protection Agency; 87 pgs.
U.S. Appl. No. 12/703,638, filed Feb. 10, 2010, Todd Dana.
U.S. Appl. No. 12/704,440, filed Feb. 11, 2010, Todd Dana.
U.S. Appl. No. 12/702,899, filed Feb. 9, 2010, Todd Dana.
U.S. Appl. No. 12/703,560, filed Feb. 10, 2010, Todd Dana.
U.S. Appl. No. 12/704,596, filed Feb. 12, 2010, Todd Dana.
U.S. Appl. No. 12/701,073, filed Feb. 5, 2010, Todd Dana.
U.S. Appl. No. 12/701,141, filed Feb. 5, 2010, Todd Dana.
PCT Application PCT/US2010/058948; filed Dec. 3, 2010; James W. Patten; International Search Report mailed Aug. 31, 2011.
PCT Application PCT/US2010/060854; filed Dec. 16, 2010; James W. Patten; International Search Report mailed Aug. 26, 2011.
Slow Sand Filter: http://en.wikipedia.org/wiki/Slow_sand_filter; Nov. 9, 2009; 4 pages.
Sand Filter: http://en.wikipedia.org/wiki/Sand_filter; Nov. 9, 2009; 6 pages.
RELATED CASE: U.S. Appl. No. 12/960,215, filed Dec. 3, 2010; James Patten.
RELATED CASE: U.S. Appl. No. 12/984,394, filed Jan. 4, 2011; Todd Dana.
U.S. Appl. No. 12/984,394, filed Jan. 4, 2011; Todd Dana; office action issued Jun. 1, 2011.
PCT Application PCT/US2010/023740; filed Feb. 10, 2010; Todd Dana; ISR issued Sep. 16, 2010.
U.S. Appl. No. 12/703,560, filed Feb. 10, 2010; Todd Dana; office action issued Apr. 24, 2012.
U.S. Appl. No. 12/703,560, filed Feb. 10, 2010; Todd Dana; notice of allowance dated Sep. 4, 2012.

* cited by examiner

CARBON MANAGEMENT AND SEQUESTRATION FROM ENCAPSULATED CONTROL INFRASTRUCTURES

RELATED APPLICATION

This application claims priority to U.S. Provisional Patent Application No. 61/152,220 filed Feb. 12, 2009 which is incorporated herein by reference.

BACKGROUND

Global and domestic demand for fossil fuels continues to rise despite price increases and other economic and geopolitical concerns. As such demand continues to rise, research and investigation into finding additional economically viable sources of fossil fuels correspondingly increases. Historically, many have recognized the vast quantities of energy stored in oil shale, coal and tar sand deposits, for example. However, these sources remain a difficult challenge in terms of economically competitive recovery. Canadian tar sands have shown that such efforts can be fruitful, although many challenges still remain, including environmental impact, product quality, production costs and process time, among others.

Estimates of world-wide oil shale reserves range from two to almost seven trillion barrels of oil, depending on the estimating source. Regardless, these reserves represent a tremendous volume and remain a substantially untapped resource. A large number of companies and investigators continue to study and test methods of recovering oil from such reserves. In the oil shale industry, methods of extraction have included underground rubble chimneys created by explosions, in-situ methods such as In-Situ Conversion Process (ICP) method (Shell Oil), and heating within steel fabricated retorts. Other methods have included in-situ radio frequency methods (microwaves), and "modified" in-situ processes wherein underground mining, blasting and retorting have been combined to make rubble out of a formation to allow for better heat transfer and product removal.

Among typical oil shale processes, all face tradeoffs in economics and environmental concerns. No current process alone satisfies economic, environmental, and technical challenges. Moreover, global warming concerns give rise to additional measures to address carbon dioxide ($CO_2$) emissions which are associated with such processes. Methods are needed that accomplish environmental stewardship, yet still provide high-volume cost-effective oil production.

Below ground in-situ concepts emerged based on their ability to produce high volumes while avoiding the cost of mining. While the cost savings resulting from avoiding mining can be achieved, the in-situ method requires heating a formation for a longer period of time due to the extremely low thermal conductivity and high specific heat of solid oil shale. Perhaps the most significant challenge for any in-situ process is the uncertainty and long term potential of water contamination that can occur with underground freshwater aquifers. In the case of Shell's ICP method, a "freeze wall" is used as a barrier to keep separation between aquifers and an underground treatment area. Although this is possible, no long term analysis has proven for extended periods to guarantee the prevention of contamination. Without guarantees and with even fewer remedies should a freeze wall fail, other methods are desirable to address such environmental risks.

For this and other reasons, the need remains for methods and systems which can provide improved recovery of hydrocarbons from suitable hydrocarbon-containing materials, which have acceptable economics and avoid the drawbacks mentioned above.

SUMMARY

A method of recovering hydrocarbons from hydrocarbonaceous materials can include forming a constructed permeability control infrastructure. This constructed infrastructure defines a substantially encapsulated volume. A mined hydrocarbonaceous material can be introduced into the control infrastructure to form a permeable body of hydrocarbonaceous material. The permeable body can be heated sufficient to remove hydrocarbons therefrom. During heating the hydrocarbonaceous material can be substantially stationary. Additionally, during heating, any carbon dioxide that is produced can be sequestered. Removed hydrocarbons can be collected for further processing, use in the process as supplemental fuel or additives, and/or direct use without further treatment.

Additional features and advantages of these principles will be apparent from the following detailed description, which illustrates, by way of example, features of the invention.

Figure 1:
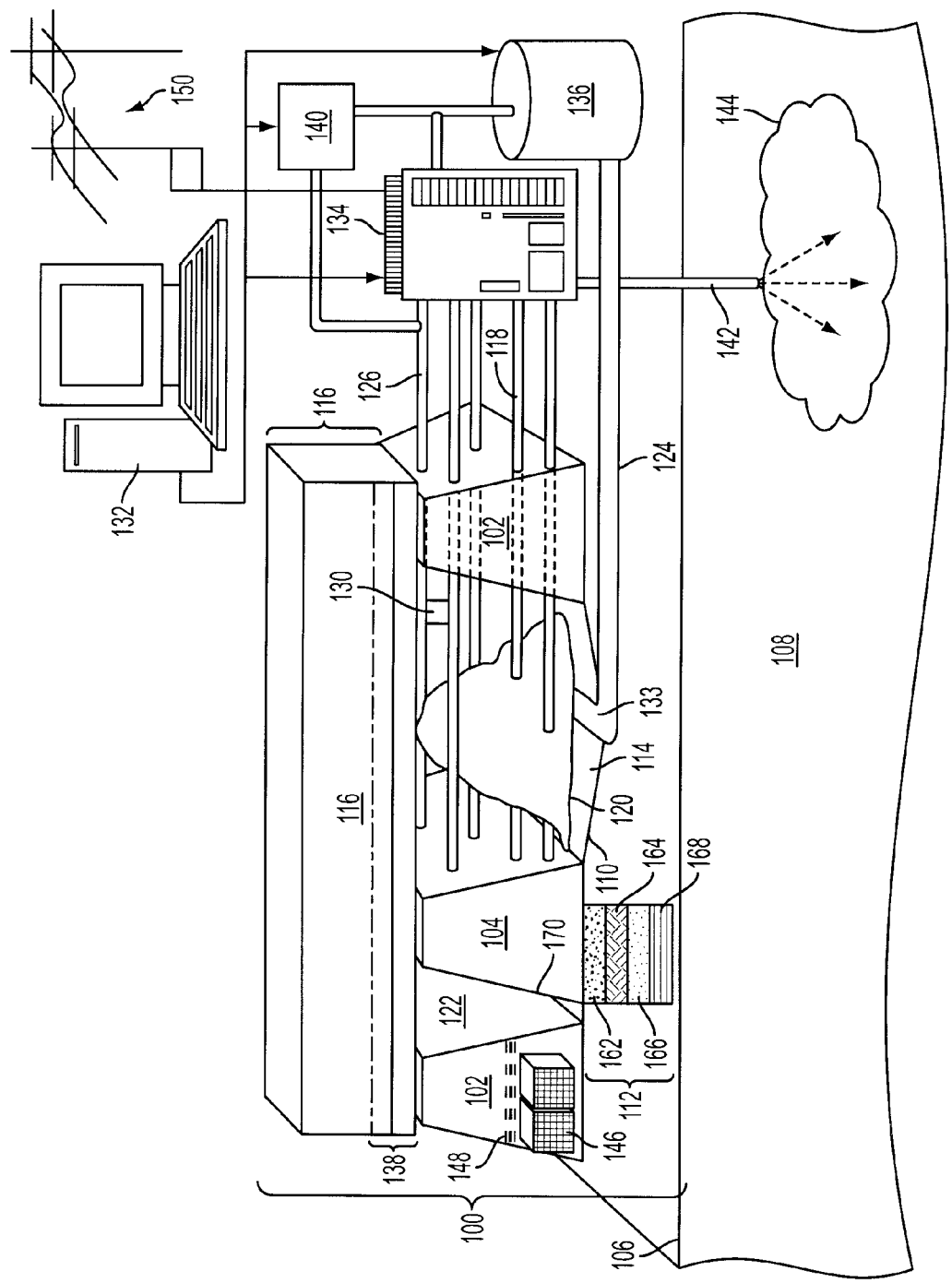
FIG. 1 is side partial cutaway view schematic of a constructed permeability control infrastructure in accordance with one embodiment.

It should be noted that the figures are merely exemplary of several embodiments and no limitations on the scope of the present invention are intended thereby. Further, the figures are generally not drawn to scale, but are drafted for purposes of convenience and clarity in illustrating various aspects of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

DEFINITIONS

In describing and claiming the present invention, the following terminology will be used.

The singular forms "a," "an," and "the" include plural references unless the context clearly dictates otherwise. Thus, for example, reference to "a wall" includes reference to one or more of such structures, "a permeable body" includes reference to one or more of such materials, and "a heating step" refers to one or more of such steps.

As used herein "existing grade" or similar terminology refers to the grade or a plane parallel to the local surface topography of a site containing an infrastructure as described herein which infrastructure may be above or below the existing grade.

As used herein, "conduits" refers to any passageway along a specified distance which can be used to transport materials and/or heat from one point to another point. Although conduits can generally be circular pipes, other non-circular conduits can also be useful. Conduits can advantageously be used to either introduce fluids into or extract fluids from the permeable body, convey heat transfer, and/or to transport radio frequency devices, fuel cell mechanisms, resistance heaters, or other devices.

As used herein, "constructed infrastructure" refers to a structure which is substantially entirely man made, as opposed to freeze walls, sulfur walls, or other barriers which are formed by modification or filling pores of an existing geological formation.

The constructed permeability control infrastructure is often substantially free of undisturbed geological formations, although the infrastructure can be formed adjacent or in direct contact with an undisturbed formation. Such a control infrastructure can be unattached or affixed to an undisturbed formation by mechanical means, chemical means, or a combination of such means, e.g. bolted into the formation using anchors, ties, or other suitable hardware.

As used herein, "comminuted" refers to breaking a formation or larger mass into pieces. A comminuted mass can be rubbilized or otherwise broken into fragments.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized or otherwise removed from the material. However, many hydro carbonaceous materials contain kerogen or bitumen which is converted to a hydrocarbon through heating and pyrolysis. Hydrocarbonaceous materials can include, but is not limited to, oil shale, tar sands, coal, lignite, bitumen, peat, and other organic materials.

As used herein, "impoundment" refers to a structure designed to hold or retain an accumulation of fluid and/or solid moveable materials. An impoundment generally derives at least a substantial portion of foundation and structural support from earthen materials. Thus, the control walls do not always have independent strength or structural integrity apart from the earthen material and/or formation against which they are formed.

As used herein, "permeable body" refers to any mass of comminuted hydro carbonaceous material having a relatively high permeability which exceeds permeability of a solid undisturbed formation of the same composition. Suitable permeable bodies can have greater than about 10% void space and typically have void space from about 30% to 45%, although other ranges may be suitable. Allowing for high permeability facilitates, for example, through the incorporation of large irregularly shaped particles, heating of the body through convection as the primary heat transfer while also substantially reducing costs associated with crushing to very small sizes, e.g. below about 1 to about 0.5 inch.

As used herein, "wall" refers to any constructed feature having a permeability control contribution to confining material within an encapsulated volume defined at least in part by control walls. Walls can be oriented in any manner such as vertical, although ceilings, floors, and other contours defining the encapsulated volume can also be "walls" as used herein.

As used herein, "mined" refers to a material which has been removed or disturbed from an original stratographic or geological location to a second and different location or returned to the same location. Typically, mined material can be produced by rubbilizing, crushing, explosively detonating, or otherwise removing material from a geologic formation.

As used herein, "adsorb," "adsorbing," or "adsorbed" refers to the process where a gas or liquid solute accumulates on the surface of a solid or a liquid or diffuses into a solid or liquid. Generally, when referring to carbon dioxide, the carbon dioxide is adsorbed into a material such that the carbon dioxide is substantially immobilized.

As used herein, "substantially stationary" refers to nearly stationary positioning of materials with a degree of allowance for subsidence, expansion, and/or settling as hydrocarbons are removed from the hydrocarbonaceous material from within the enclosed volume to leave behind lean material. In contrast, any circulation and/or flow of hydrocarbonaceous material such as that found in fluidized beds or rotating retorts involves highly substantial movement and handling of hydrocarbonaceous material.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Carbon Management and Sequestration from Control Infrastructures

A method of recovering hydrocarbons from hydrocarbonaceous materials can include forming a constructed permeability control infrastructure. This constructed infrastructure defines a substantially encapsulated volume. A mined or harvested hydro carbonaceous material can be introduced into the control infrastructure to form a permeable body of hydrocarbonaceous material. The permeable body can be heated sufficient to remove hydrocarbons therefrom. During heating, the hydrocarbonaceous material is substantially stationary as the constructed infrastructure is a fixed structure. Additionally, during heating, at least a portion of carbon dioxide that is produced can be sequestered. Removed fluid hydrocarbons can be collected for further processing, use in the process, and/or use as recovered.

The constructed permeability control infrastructure can be formed using existing grade as floor support and/or as side wall support for the constructed infrastructure. For example, the control infrastructure can be formed as a free standing structure, i.e. using only existing grade as a floor with side walls being man-made. Alternatively, the control infrastructure can be formed within an excavated pit. Regardless, the control infrastructures are always formed above-grade.

A constructed permeability control infrastructure can include a permeability control impoundment which defines a substantially encapsulated volume. The permeability control impoundment is substantially free of undisturbed geological formations. Specifically, the permeability control aspect of the impoundment can be completely constructed and man-made as a separate isolation mechanism for prevention of uncontrolled migration of material into or out of the encapsulated volume.

In one embodiment, the permeability control impoundment can be formed along walls of an excavated hydrocarbonaceous material deposit. For example, oil shale, tar sands, or coal can be mined from a deposit to form a cavity which corresponds approximately to a desired encapsulation volume for an impoundment. The excavated cavity can then be used as a form and support to create the permeability control impoundment.

In one alternative aspect, at least one additional excavated hydrocarbonaceous material deposit can be formed such that a plurality of impoundments can be operated. Further, such a configuration can facilitate a reduction in transportation distance of the mined material. Specifically, the mined hydro carbonaceous material for any particular encapsulated volume can be mined from an adjacent excavated hydrocarbonaceous material deposit. In this manner, a grid of constructed structures can be built such that mined material can be immediately and directly filled into an adjacent impoundment.

Mining and/or excavation of hydrocarbonaceous deposits can be accomplished using any suitable technique. Conventional surface mining can be used, although alternative excavators can also be used without requirement of transportation of the mined materials. In one specific embodiment, the hydrocarbonaceous deposit can be excavated using a crane-suspended excavator. One example of a suitable excavator can include vertical tunnel boring machines. Such machines can be configured to excavate rock and material beneath the excavator. As material is removed, the excavator is lowered to ensure substantially continuous contact with a formation. Removed material can be conveyed out of the excavation area using conveyors or lifts. Alternatively, the excavation can occur under aqueous slurry conditions to reduce dust problems and act as a lubricant/coolant. The slurry material can be pumped out of the excavation for separation of solids in a settling tank or other similar solid-liquid separator, or the solids may be allowed to precipitate directly in an impoundment. This approach can be readily integrated with simultaneous or sequential solution-based recovery of metals and other materials as described in more detail below.

Further, excavation and formation of a permeability control impoundment can be accomplished simultaneously. For example, an excavator can be configured to remove hydrocarbonaceous material while side walls of an impoundment are formed. Material can be removed from just underneath edges of the side walls such that the walls can be guided downward to allow additional wall segments to be stacked above. This approach can allow for increased depths while avoiding or reducing dangers of cave-in prior to formation of supporting impoundment walls.

The impoundment can be formed of any suitable material which provides isolation of material transfer across walls of the impoundment. In this manner, integrity of the walls is retained during operation of the control infrastructure sufficient to substantially prevent uncontrolled migration of fluids outside of the control infrastructure. Non-limiting examples of suitable material for use in forming the impoundment of the constructed permeability control infrastructure can include clay, bentonite clay (e.g. clay comprising at least a portion of bentonite), bentonite amended soil, compacted fill, refractory cement, cement, synthetic geogrids, fiberglass, rebar, nanocarbon fullerene additives, filled geotextile bags, polymeric resins, oil resistant PVC liners, or combinations thereof. Engineered cementitious composites (ECC) materials, fiber reinforced composites, and the like can be particularly strong and can be readily engineered to meet permeability and temperature tolerance requirements of a given installation. As a general guideline, materials having low permeability and high mechanical integrity at operating temperatures of the infrastructure can provide good performance, although are not required. For example, materials having a melting point above the maximum operating temperature of the infrastructure can be useful to maintain containment during and after heating and recovery. However, lower temperature materials can also be used if a non-heated buffer zone is maintained between the walls and heated portions of the permeable body. Such buffer zones can range from 6 inches to 50 feet depending on the particular material used for the impoundment and the composition of the permeable body. In another aspect, walls of the impoundment can be acid, water, and/or brine resistant, e.g. sufficient to withstand exposure to solvent recovery and/or rinsing with acidic or brine solutions, as well as to steam or water. For impoundment walls formed along formations or other solid support, the impoundment walls can be formed of a sprayed grouting, sprayed liquid emulsions, or other sprayed material such as sprayable refractory grade grouting which forms a seal against the formation and creates the permeability control wall of the impoundments. Impoundment walls may be substantially continuous such that the impoundment defines the encapsulated volume sufficiently to prevent substantial movement of fluids into or out of the impoundment other than defined inlets and outlets, e.g. via conduits or the like as discussed herein. In this manner, the impoundments can readily meet government fluid migration regulations. Alternatively, or in combination with a manufactured barrier, portions of the impoundment walls can be undisturbed geological formation and/or compacted earth. In such cases, the constructed permeability control infrastructure is a combination of permeable and impermeable walls as described in more detail below.

In one detailed aspect, a portion of hydro carbonaceous material, either pre- or post-processed, can be used as a cement fortification and/or cement base which are then poured in place to form portions or the entirety of walls of the control infrastructure. These materials can be formed in place or can be preformed and then assembled on site to form an integral impoundment structure. For example, the impoundment can be constructed by cast forming in place as a monolithic body, extrusion, stacking of preformed or precast pieces, concrete panels joined by a grout (cement, ECC, or other suitable material), inflated form, or the like. The forms can be built up against a formation or can be stand alone structures. Forms can be constructed of any suitable material such as, but not limited to, steel, wood, fiberglass, polymer, or the like. The forms can be assembled in place or may be oriented using a crane or other suitable mechanism. Alternatively, the constructed permeability control infrastructure can be formed of gabions and/or geosynthetic fabrics assembled in layers with compacted fill material. Optional binders can be added to enhance compaction of the permeability control walls. In yet another detailed aspect, the control infrastructure can comprise, or consists essentially of, sealant, grout, rebar, synthetic clay, bentonite clay, clay lining, refractory cement, high temperature geomembranes, drain pipes, alloy sheets, or combinations thereof.

Impoundment walls can optionally include non-permeable insulation and/or fines collection layers. These permeable layers can be oriented between the permeability control barrier and the permeable body. For example, a layer of hydrocarbonaceous comminuted material can be provided which allows fluids to enter, cool, and at least partially condense within the layer. Such permeable layer material can generally have a particle size smaller than the permeable body. Further, such hydrocarbonaceous material can remove fines from passing fluids via various attractive forces. In one embodiment, the construction of impoundment walls and floors can include multiple compacted layers of indigenous or manipulated low grade shale with any combination of sand, cement, fiber, plant fiber, nano carbons, crushed glass, reinforcement steel, engineered carbon reinforcement grid, calcium salts, and the like. In addition to such composite walls, designs which inhibit long term fluid and gas migration through additional impermeability engineering can be employed including, but not limited to, liners, geo-membranes, compacted soils, imported sand, gravel or rock and gravity drainage contours to move fluids and gases away from impervious layers to egress exits. Impoundment floor and wall construction, can, but need not comprise, a stepped up or stepped down slope or bench as the case of mining course may dictate following the optimal ore grade mining. In any such stepped up or down applications, floor leveling and containment wall construction can typically drain or slope to one side or to a specific central gathering area(s) for removal of fluids by gravity drainage assistance.

Optionally, capsule wall and floor construction can include insulation which prevents heat transfer outside of the constructed infrastructure or outside of inner capsules or conduits within the primary constructed capsule containment. Insulation can comprise manufactured materials, cement or various materials other materials which are less thermally conductive than surrounding masses, i.e. permeable body, formation, adjacent infrastructures, etc. Thermally insulating barriers can also be formed within the permeable body, along impoundment walls, ceilings, and/or floors. One detailed aspect includes the use of biodegradable insulating materials, e.g. soy insulation and the like. This is consistent with embodiments wherein the impoundment is a single use system such that insulations, pipes, and/or other components can have a relatively low useful life, e.g. less than 1-2 years. This can reduce equipment costs as well as reduce long-term environmental impact.

These structures and methods can be applied at almost any scale. Larger encapsulated volumes and increased numbers of impoundments can readily produce hydrocarbon products and performance comparable to or exceeding smaller constructed infrastructures. As an illustration, single impoundments can range in size from tens of meters across to tens of acres. Optimal impoundment sizes may vary depending on the hydrocarbonaceous material and operating parameters, however it is expected that suitable areas can range from about one-half to five acres in top plan surface area.

The methods and infrastructures can be used for recovery of hydrocarbons from a variety of hydrocarbonaceous materials. One particular advantage is a wide degree of latitude in controlling particle size, conditions, and composition of the permeable body introduced into the encapsulated volume. Non-limiting examples of mined hydrocarbonaceous material which can be treated comprise oil shale, tar sands, coal, lignite, bitumen, peat, or combinations thereof. In some cases it can be desirable to provide a single type of hydro carbonaceous material so that the permeable body consists essentially of one of the above materials. However, the permeable body can include mixtures of these materials such that grade, oil content, hydrogen content, permeability and the like can be adjusted to achieve a desired result. Further, different hydrocarbon materials can be placed in multiple layers or in a mixed fashion such as combining coal, oil shale, tar sands, biomass, and/or peat.

In one embodiment, hydrocarbon containing material can be classified into various inner capsules within a primary constructed infrastructure for optimization reasons. For instance, layers and depths of mined oil shale formations may be richer in certain depth pay zones as they are mined. Once blasted, mined, shoveled, and hauled inside of capsule for placement, richer oil bearing ores can be classified or mixed by richness for optimal yields, faster recovery, or for optimal averaging within each impoundment. Further, providing layers of differing composition can have added benefits. For example, a lower layer of tar sands can be oriented below an upper layer of oil shale. Generally, the upper and lower layers can be in direct contact with one another although this is not required. The upper layer can include heating pipes embedded therein as described in more detail below. The heating pipes can heat the oil shale sufficient to liberate kerogen oil, including short-chain liquid hydrocarbons, which can act as a solvent for bitumen removal from the tar sands. In this manner, the upper layer acts as an in situ solvent source for enhancing bitumen removal from the lower layer. Heating pipes within the lower layer are optional such that the lower layer can be free of heating pipes or may include heating pipes, depending on the amount of heat transferred via downward passing liquids from the upper layer and any other heat sources. The ability to selectively control the characteristics and composition of the permeable body adds a significant amount of freedom in optimizing oil yields and quality.

Furthermore, in many embodiments, the liberated gaseous and liquid products act as an in situ produced solvent which supplements kerogen removal and/or additional hydrocarbon removal from the hydrocarbonaceous material.

In yet another detailed aspect, the permeable body can further comprise an additive or biomass. Additives can include any composition which acts to increase the quality of removed hydrocarbons, e.g. increased API, decreased viscosity, improved flow properties, reduced wetting of residual shale, reduction of sulfur, hydrogenation agents, etc. Non-limiting examples of suitable additives can include bitumen, kerogen, propane, natural gas, natural gas condensate, crude oil, refining bottoms, asphaltenes, common solvents, other diluents, and combinations of these materials. In one specific embodiment, the additive can include a flow improvement agent and/or a hydrogen donor agent. Some materials can act as both or either agents to improve flow or as a hydrogen donor. Non-limiting examples of such additives can include methane, natural gas condensates, common solvent such as acetone, toluene, benzene, etc., and other additives listed above. Additives can act to increase the hydrogen to carbon ratio in any hydrocarbon products, as well as act as a flow enhancement agent. For example, various solvents and other additives can create a physical mixture which has a reduced viscosity and/or reduced affinity for particulate solids, rock, and the like. Further, some additives can chemically react with hydrocarbons and/or allow liquid flow of the hydrocarbon products. Any additives used can become part of a final recovered product or can be removed and reused or otherwise disposed of.

Similarly, biological hydroxylation of hydrocarbonaceous materials to form synthetic gas or other lighter weight products can be accomplished using known additives and approaches. Enzymes or biocatalysts can also be used in a similar manner. Further, manmade materials can also be used as additives such as, but not limited to, tires, polymeric refuse, or other hydrocarbon-containing materials.

Although these methods are broadly applicable, as a general guideline, the permeable body can include particles from about 1/8 inch to about 6 feet in largest dimension, and in some cases less than 1 foot and in other cases less than about 6 inches. However, as a practical matter, sizes from about 2 inches to about 2 feet can provide good results with about 1 foot diameter being useful for oil shale especially. Void space can be an important factor in determining optimal particle diameters. As a general matter, any functional void space can be used; however, about 10% to about 50% and in some cases about 30% to about 45% usually provides a good balance of permeability and effective use of available volumes. Void volumes can be varied somewhat by varying other parameters such as heating conduit placement, additives, and the like. Mechanical separation of mined hydrocarbonaceous materials allows creation of fine mesh, high permeability particles which enhance thermal dispersion rates once placed in capsule within the impoundment. The added permeability allows for more reasonable, low temperatures which also help to avoid higher temperatures which result in greater $CO_2$ production from carbonate decomposition and associated release of trace heavy metals, volatile organics, and other compounds which can create toxic effluent and/or undesirable materials which are monitored and controlled.

Carbon dioxide that is produced during the recovery process can be sequestered using one or more approaches. In particular, carbon dioxide can be converted to a solid or liquid form such that the associated carbon is precipitated or otherwise converted to a useful product. Such sequestering can be optionally accomplished by reacting carbon dioxide with an aqueous solution to form a precipitation of carbon dioxide with a metal. When referring to carbon dioxide precipitates or precipitating carbon dioxide, it is understood that precipitation consumes the carbon dioxide such that the carbon dioxide no longer exists as a $CO_2$ structure. As such, the process is generally irreversible and differs from general adsorption techniques, which can also be used for sequestering carbon dioxide as further described herein. In one embodiment, the aqueous solution can be an ionic solution. In another embodiment, the aqueous solution can be salt water. The metal can be any metal that is capable of forming a solid with carbon dioxide including oxides thereof. In one embodiment, the metal can be calcium, magnesium, including oxides thereof, silicates thereof, and mixtures thereof. In one embodiment, the metal can be in the form of forsterite, serpentine and/or peridotite. In one embodiment, the exhausted hydrocarbonaceous materials can be injected or admixed with the carbon dioxide and salt water to form carbon dioxide precipitates. Such a process can take advantage of metals found in the exhausted hydrocarbonaceous materials.

Additionally, other materials can be added to increase the reaction kinetics to form the carbon dioxide precipitate. For example, the addition of acids, catalysts, or other organic compounds may increase the reaction kinetics. Such sequestering can also produce heat during the sequestering process. In one embodiment, the heat can be redirected and applied to the heating step as discussed herein. Such recycling of heat can further provide a more efficient recovery system.

Additionally, or alternatively, sequestering of carbon dioxide can be achieved by cryogenic precipitation forming liquid carbon dioxide. The collected carbon dioxide can be liquefied by lowering the temperature. Such liquid carbon dioxide can then be transferred to a container for disposal or for reuse. In one embodiment, the liquid carbon dioxide can be reacted to form polycarbonates, which can provide a stable form for disposal or potential use in other industries. In another embodiment, the liquid carbon dioxide can be used to further process the exhausted hydrocarbonaceous materials, as further discussed herein, including rinsing the hydrocarbonaceous materials during the recovery process. Such treatment can provide additional recovery of hydrocarbons that have not been removed during the initial recovery process as described herein.

The sequestered carbon dioxide can be used in other commercial processes. In one embodiment, carbon dioxide can be used to isolate polymers from fluids. For example, carbon dioxide can be used to isolate polycarbonates from a solvent, e.g. methylene chloride. In another embodiment, carbon dioxide can be pumped into depleted permeable bodies. In the case of permeable bodies having a high coal content, once the initial stores of methane or other products are recovered, $CO_2$ can be pumped into the impoundment, where it is stored in the coal, which can then provide the benefit of releasing additional methane. Between three and thirteen molecules of $CO_2$ can be absorbed for each molecule of methane, making coal an excellent storage location for $CO_2$.

In one embodiment, storage of carbon dioxide can be performed in deep saline aquifers or brine-saturated rock formations that occur deep underground or under the ocean. Specifically, wells deep underground consisting of porous rock, such as limestone or sandstone, saturated with saltwater can form an effective trap for injected $CO_2$. Geologically, over time, some $CO_2$ can react with rock minerals to form solid carbonates, further immobilizing the same.

Additionally, a liquid carbon dioxide can be optionally mixed and/or adsorbed by the exhausted hydrocarbonaceous materials. Such materials can then be disposed in an appropriate manner. When referring to liquid carbon dioxide, the embodiments herein can also be used with supercritical carbon dioxide. As such, the discussion and embodiments presented herein referring to liquid carbon dioxide also can be applied with respect to supercritical carbon dioxide.

In another embodiment, sequestering carbon dioxide can be achieved by injecting exhausted hydrocarbonaceous materials with the carbon dioxide. Such injection can provide adsorption of carbon dioxide. Additionally, such process can be performed with a catalyst or without a catalyst. Other metal and organic additives can be included as discussed herein. In one embodiment, such sequestering can include a metal selected from the group consisting of calcium, magnesium, including oxides thereof, silicates thereof, and mixtures thereof.

With respect to carbon dioxide sequestering, a constructed permeability control infrastructure can comprise a permeability control impoundment defining a substantially encapsulated volume wherein the permeability control impoundment is substantially free of undisturbed geological formations, a comminuted hydrocarbonaceous material within the encapsulated volume forming a permeable body of hydrocarbonaceous material, and a carbon dioxide collection unit operatively connected to collect carbon dioxide from the control infrastructure. It is understood that the infrastructure can include any of the elements described herein including those elements that have been referred to in the context of a process. Additionally, the methods and processes described herein can include any elements described herein including those elements that have been referred to in the context of a composition or system.

The carbon dioxide can be collected consistent with one or more of the above approaches using a corresponding carbon dioxide control unit. In one optional aspect, the carbon dioxide control unit can include a vessel for treatment and/or storage of the carbon dioxide. Additional storage tanks, pumps and/or vessels can also be used for transporting or storage of treatment chemicals and by-products. As described herein, the vessel can contain an aqueous solution, a metal, and carbon dioxide where the vessel is configured to react the carbon dioxide with the aqueous solution to form a precipitation of carbon dioxide with the metal. In another embodiment, the vessel can contain carbon dioxide where the vessel is configured to form liquid carbon dioxide from the carbon dioxide by cryogenic precipitation. Additionally, the vessel can contain exhausted hydrocarbonaceous materials that adsorb the liquid carbon dioxide. In one embodiment, the vessel can contain carbon dioxide where the vessel is configured to mix exhausted hydrocarbonaceous materials with the carbon dioxide such that the exhausted hydrocarbonaceous materials adsorb the carbon dioxide.

In one embodiment, computer assisted mining, mine planning, hauling, blasting, assay, loading, transport, placement, and dust control measures can be utilized to fill and optimize the speed of mined material movement into the constructed capsule containment structure. In one alternative aspect, the impoundments can be formed in excavated volumes of a hydrocarbonaceous formation, although other locations remote from the control infrastructure can also be useful. For example, some hydrocarbonaceous formations have relatively thin hydrocarbon-rich layers, e.g. less than about 300 feet thick. Therefore, vertical mining and drilling tend to not be cost effective. In such cases, horizontal mining can be useful to recover the hydrocarbonaceous materials for formation of the permeable body. Although horizontal mining continues to be a challenging endeavor, a number of technologies have been developed and continue to be developed which can be useful in connection with the impoundments. In such cases, at least a portion of the impoundment can be formed across a horizontal layer, while other portions of the impoundment can be formed along and/or adjacent non-hydrocarbon bearing formation layers. Other mining approaches such as, but not limited to, room and pillar mining can provide an effective source of hydrocarbonaceous material with minimal waste and/or reclamation which can be transported to an impoundment and treated in accordance with the these principles.

As mentioned herein, these systems and processes allow for a large degree of control regarding properties and characteristics of the permeable body which can be designed and optimized for a given installation. Impoundments, individually and across a plurality of impoundments can be readily tailored and classified based on varying composition of materials, intended products and the like. For example, several impoundments can be dedicated to production of heavy crude oil, while others can be configured for production of lighter products and/or syn gas. Non-limiting example of potential classifications and factors can include catalyst activity, enzymatic reaction for specific products, aromatic compounds, hydrogen content, microorganism strain or purpose, upgrading process, target final product, pressure (effects product quality and type), temperature, swelling behavior, aquathermal reactions, hydrogen donor agents, heat superdisposition, garbage impoundment, sewage impoundment, reusable pipes, and others. Typically, a plurality of these factors can be used to configure impoundments in a given project area for distinct products and purposes.

The comminuted hydrocarbonaceous material can be filled into the control infrastructure to form the permeable body in any suitable manner. Typically the comminuted hydrocarbonaceous material can be conveyed into the control infrastructure by dumping, conveyors or other suitable approaches. As mentioned previously, the permeable body can have a suitably high void volume. Indiscriminate dumping can result in excessive compaction and reduction of void volumes. Thus, the permeable body can be formed by low compaction conveying of the hydrocarbonaceous material into the infrastructure. For example, retracting conveyors can be used to deliver the material near a top surface of the permeable body as it is formed. In this way, the hydrocarbonaceous material can retain a significant void volume between particles without substantial further crushing or compaction despite some small degree of compaction which often results from lithostatic pressure as the permeable body is formed.

Once a desired permeable body has been formed within the control infrastructure, heat can be introduced sufficient to begin removal of hydrocarbons, e.g. via pyrolysis. A suitable heat source can be thermally associated with the permeable body. Optimal operating temperatures within the permeable body can vary depending on the composition and desired products. However, as a general guideline, operating temperatures can range from about 200° F. to about 750° F. Temperature variations throughout the encapsulated volume can vary and may reach as high as 900° F. or more in some areas. In one embodiment, the operating temperature can be a relatively lower temperature to facilitate production of liquid product such as from about 200° F. to about 650° F. This heating step can be a roasting operation which results in beneficiation of the crushed ore of the permeable body. Further, one embodiment comprises controlling the temperature, pressure and other variables sufficient to produce predominantly, and in some cases substantially only, liquid product. Generally, products can include both liquid and gaseous products, while liquid products can require fewer processing steps such as scrubbers etc. The relatively high permeability of the permeable body allows for production of liquid hydrocarbon products and minimization of gaseous products, depending to some extent on the particular starting materials and operating conditions. In one embodiment, the recovery of hydrocarbon products can occur substantially in the absence of cracking within the permeable body.

In one aspect, heat can be transferred to the permeable body via convection. Heated gases can be injected into the control infrastructure such that the permeable body is primarily heated via convection as the heated gases pass throughout the permeable body. Heated gases can be produced by combustion of natural gas, hydrocarbon product, or any other suitable source. Non-limiting examples of suitable heat transfer fluids can include hot air, hot exhaust gases, steam, hydrocarbon vapors and/or hot liquids. The heated gases can be imported from external sources or recovered from the process.

Alternatively, or in combination with convective heating, a highly configurable approach can include embedding a plurality of conduits within the permeable body. The conduits can be configured for use as heating pipes, cooling pipes, heat transfer pipes, drainage pipes, or gas pipes. Further, the conduits can be dedicated to a single function or may serve multiple functions during operation of the infrastructure, i.e. heat transfer and drainage. The conduits can be formed of any suitable material, depending on the intended function. Non-limiting examples of suitable materials can include clay pipes, refractory cement pipes, refractory ECC pipes, poured in place pipes, metal pipes such as cast iron, stainless steel etc., polymer such as PVC, and the like. In one specific embodiment, all or at least a portion of the embedded conduits can comprise a degradable material. For example, non-galvanized 6" cast iron pipes can be effectively used for single use embodiments and perform well over the useful life of the impoundment, typically less than about 2 years. Further, different portions of the plurality of conduits can be formed of different materials. Poured in place pipes can be especially useful for very large encapsulation volumes where pipe diameters exceed several feet. Such pipes can be formed using flexible wraps which retain a viscous fluid in an annular shape. For example, PVC pipes can be used as a portion of a form along with flexible wraps, where concrete or other viscous fluid is pumped into an annular space between the PVC and flexible wrap. Depending on the intended function, perforations or other apertures can be made in the conduits to allow fluids to flow between the conduits and the permeable body. Typical operating temperatures exceed the melting point of conventional polymer and resin pipes. In some embodiments, the conduits can be placed and oriented such that the conduits intentionally melt or otherwise degrade during operation of the infrastructure.

The plurality of conduits can be readily oriented in any configuration, whether substantially horizontal, vertical, slanted, branched, or the like. At least a portion of the conduits can be oriented along predetermined pathways prior to embedding the conduits within the permeable body. The predetermined pathways can be designed to improve heat transfer, gas-liquid-solid contacting, maximize fluid delivery or removal from specific regions within the encapsulated volume, or the like. Further, at least a portion the conduits can be dedicated to heating of the permeable body. These heating conduits can be selectively perforated to allow heated gases or other fluids to convectively heat and mix throughout the permeable body. The perforations can be located and sized to optimize even and/or controlled heating throughout the permeable body. Alternatively, the heating conduits can form a closed loop such that heating gases or fluids are segregated from the permeable body. Thus, a "closed loop" does not necessarily require recirculation, rather isolation of heating fluid from the permeable body. In this manner, heating can be accomplished primarily or substantially only through thermal conduction across the conduit walls from the heating fluids into the permeable body. Heating in a closed loop allows for prevention of mass transfer between the heating fluid and permeable body and can reduce formation and/or extraction of gaseous hydrocarbon products.

During the heating or roasting of the permeable body, localized areas of heat which exceed parent rock decomposition temperatures, often above about 900° F., can reduce yields and form carbon dioxide and undesirable contaminating compounds which can lead to leachates containing heavy metals, soluble organics and the like. The heating conduits can allow for substantial elimination of such localized hot spots while maintaining a vast majority of the permeable body within a desired temperature range. The degree of uniformity in temperature can be a balance of cost (e.g. for additional heating conduits) versus yields. However, at least about 85% of the permeable body can readily be maintained within about 5-10% of a target temperature range with substantially no hot spots, i.e. exceeding the decomposition temperature of the hydrocarbonaceous materials such as about 800° F. and in many cases about 900° F. Thus, operated as described herein, the systems can allow for recovery of hydrocarbons while eliminating or substantially avoiding production of undesirable leachates. Although products can vary considerably depending on the starting materials, high quality liquid and gaseous products are possible. In accordance with one embodiment, a crushed oil shale material can produce a liquid product having an API from about 30 to about 45, with about 33 to about 38 being currently typical, directly from the oil shale without additional treatment. Interestingly, practice of these processes has led to an understanding that pressure appears to be a much less influential factor on the quality of recovered hydrocarbons than temperature and heating times. Although heating times can vary considerably, depending on void space, permeable body composition, quality, etc., as a general guideline times can range from a few days (i.e. 3-4 days) up to about one year. In one specific example, heating times can range from about 2 weeks to about 4 months. Under-heating oil shale at short residence times, i.e. minutes to several hours, can lead to formation of leachable and/or somewhat volatile hydrocarbons. Accordingly, these systems and methods allow for extended residence times at moderate temperatures such that organics present in oil shale can be volatilized and/or carbonized, leaving insubstantial leachable organics. In addition, the underlying shale is not generally decomposed or altered which reduces soluble salt formation.

Further, conduits can be oriented among a plurality of impoundments and/or control infrastructures to transfer fluids and/or heat between the structures. The conduits can be welded to one another using conventional welding or the like. Further, the conduits can include junctions which allow for rotation and or small amounts of movement during expansion and subsidence of material in the permeable body. Additionally, the conduits can include a support system which acts to support the assembly of conduits prior to and during filling of the encapsulated volume, as well as during operation. For example, during heating flows of fluids, heating and the like can cause expansion (fracturing or popcorn effect) or subsidence sufficient to create potentially damaging stress and strain on the conduits and associated junctions. A truss support system or other similar anchoring members can be useful in reducing damage to the conduits. The anchoring members can include cement blocks, 1-beams, rebar, columns, etc.

which can be associated with walls of the impoundment, including side walls, floors and ceilings.

Alternatively, the conduits can be completely constructed and assembled prior to introduction of any mined materials into the encapsulated volume. Care and planning can be considered in designing the predetermined pathways of the conduits and method of filling the volume in order to prevent damage to the conduits during the filling process as the conduits are buried. Thus, as a general rule, the conduits are oriented ab initio, or prior to embedding in the permeable body such that they are non-drilled. As a result, construction of the conduits and placement thereof can be performed without extensive core drilling and/or complicated machinery associated with well-bore or horizontal drilling. Rather, horizontal or any other orientation of conduit can be readily achieved by assembling the desired predetermined pathways prior to, or contemporaneous with, filling the infrastructure with the mined hydrocarbonaceous material. The non-drilled, hand/crane-placed conduits oriented in various geometric patterns can be laid with valve controlled connecting points which yield precise and closely monitored heating within the capsule impoundment. The ability to place and layer conduits including connecting, bypass and flow valves, and direct injection and exit points, allow for precision temperature and heating rates, precision pressure and pressurization rates, and precision fluid and gas ingress, egress and composition admixtures. For example, when a bacteria, enzyme, or other biological material is used, optimal temperatures can be readily maintained throughout the permeable body to increase performance, reaction, and reliability of such biomaterials.

The conduits will generally pass through walls of the constructed infrastructure at various points. Due to temperature differences and tolerances, it can be beneficial to include an insulating material at the interface between the wall and the conduits. The dimensions of this interface can be minimized while also allowing space for thermal expansion differences during startup, steady-state operation, fluctuating operating conditions, and shutdown of the infrastructure. The interface can also involve insulating materials and sealant devices which prevent uncontrolled egress of hydrocarbons or other materials from the control infrastructure. Non-limiting examples of suitable materials can include high temperature gaskets, metal alloys, ceramics, clay or mineral liners, composites or other materials which having melting points above typical operating temperatures and act as a continuation of the permeability control provided by walls of the control infrastructure.

Further, walls of the constructed infrastructure can be configured to minimize heat loss. In one aspect, the walls can be constructed having a substantially uniform thickness which is optimized to provide sufficient mechanical strength while also minimizing the volume of wall material through which the conduits pass. Specifically, excessively thick walls can reduce the amount of heat which is transferred into the permeable body by absorbing the same through conduction. Conversely, the walls can also act as a thermal barrier to somewhat insulate the permeable body and retain heat therein during operation.

In one embodiment, fluid and gas compounds within the permeable body can be altered for desired extractive products using, as an example, induced pressure through gases or piled lithostatic pressure from piled rubble. Thus, some degree of upgrading and/or modification can be accomplished simultaneous with the recovery process. Further, certain hydro carbonaceous materials can require treatment using specific diluents or other materials. For example, treatment of tar sands can be readily accomplished by steam injection or solvent injection to facilitate separation of bitumen from sand particles according to well known mechanisms.

With the above description in mind, FIG. 1 depicts a side view of one embodiment showing an engineered capsule containment and extraction impoundment 100 where existing grade 108 is used primarily as support for the impermeable floor layer 112. Exterior capsule impoundment side walls 102 provide containment and can, but need not be, subdivided by interior walls 104. Subdividing can create separate containment capsules 122 within a greater capsule containment of the impoundment 100 which can be any geometry, size or subdivision. Further subdivisions can be horizontally or vertically stacked. By creating separate containment capsules 122 or chambers, classification of lower grade materials, varied gases, varied liquids, varied process stages, varied enzymes or microbiology types, or other desired and staged processes can be readily accommodated. Sectioned capsules constructed as silos within larger constructed capsules can also be designed to provide staged and sequenced processing, temperatures, gas and fluid compositions and thermal transfers. Such sectioned capsules can provide additional environmental monitoring and can be built of lined and engineered tailings berms similar to the primary exterior walls. In one embodiment, sections within the impoundment 100 can be used to place materials in isolation, in the absence of external heat, or with the intent of limited or controlled combustion or solvent application. Lower content hydrocarbon bearing material can be useful as a combustion material or as fill or a berm wall building material. Material which does not meet a various cut-off grade thresholds can also be sequestered without alteration in an impoundment dedicated for such purpose. In such embodiments, such areas may be completely isolated or bypassed by heat, solvents, gases, liquids, or the like. Optional monitoring devices and/or equipment can be permanently or temporarily installed within the impoundment or outside perimeters of the impoundments in order to verify containment of the sequestered material.

Walls 102 and 104 as well as cap 116 and impermeable layer 112 can be engineered and reinforced by gabions 146 and or geogrid 148 layered in fill compaction. Alternatively, these walls 102, 104, 116 and 112 which comprise the permeability control impoundment and collectively define the encapsulated volume can be formed of any other suitable material as previously described. In this embodiment, the impoundment 100 includes side walls 102 and 104 which are self-supporting. In one embodiment, tailings berms, walls, and floors can be compacted and engineered for structure as well as permeability. The use of compacted geogrids and other deadman structures for support of berms and embankments can be included prior to or incorporated with permeability control layers which may include sand, clay, bentonite clay, gravel, cement, grout, reinforced cement, refractory cements, insulations, geo-membranes, drainpipes, temperature resistant insulations of penetrating heated pipes, etc.

In one alternative embodiment, the permeability control impoundment can include side walls which are compacted earth and/or undisturbed geological formations while the cap and floors are impermeable. Specifically, in such embodiments an impermeable cap can be used to prevent uncontrolled escape of volatiles and gases from the impoundment such that appropriate gas collection outlets can be used. Similarly, an impermeable floor can be used to contain and direct collected liquids to a suitable outlet such the drain system 133 to remove liquid products from lower regions of the impoundment. Although impermeable side walls can be desirable in some embodiments, such are not always required. In some cases, side walls can be exposed undisturbed earth or compacted fill or earth, or other permeable material. Having permeable side walls may allow some small egress of gases and/or liquids from the impoundment.

Although not shown, above, below, around and adjacent to constructed capsule containment vessels environmental hydrology measures can be engineered to redirect surface water away from the capsule walls, floors, caps, etc. during operation. Further, gravity assisted drainage pipes and mechanisms can be utilized to aggregate and channel fluids, liquids or solvents within the encapsulated volume to central gathering, pumping, condensing, heating, staging and discharge pipes, silos, tanks, and/or wells as needed. In a similar manner, steam and/or water which is intentionally introduce, e.g. for tar sands bitumen treatment, can be recycled.

Once wall structures 102 and 104 have been constructed above a constructed and impermeable floor layer 112 which commences from ground surface 106, the mined rubble 120 (which may be crushed or classified according to size or hydrocarbon richness), can be placed in layers upon (or next to) placed tubular heating pipes 118, fluid drainage pipes 124, and, or gas gathering or injection pipes 126. These pipes can be oriented and designed in any optimal flow pattern, angle, length, size, volume, intersection, grid, wall sizing, alloy construction, perforation design, injection rate, and extraction rate. In some cases, pipes such as those used for heat transfer can be connected to, recycled through or derive heat from heat source 134. Alternatively, or in combination with, recovered gases can be condensed by a condenser 140. Heat recovered by the condenser can be optionally used to supplement heating of the permeable body or for other process needs.

Heat source 134 can derive, amplify, gather, create, combine, separate, transmit or include heat derived from any suitable heat source including, but not limited to, fuel cells (e.g. solid oxide fuel cells, molten carbonate fuel cells and the like), solar sources, wind sources, hydrocarbon liquid or gas combustion heaters, geothermal heat sources, nuclear power plant, coal fired power plant, radio frequency generated heat, wave energy, flameless combustors, natural distributed combustors, or any combination thereof. In some cases, electrical resistive heaters or other heaters can be used, although fuel cells and combustion-based heaters are particularly effective. In some locations, geothermal water can be circulated to the surface in adequate amounts to heat the permeable body and directed into the infrastructure.

In another embodiment, electrically conductive material can be distributed throughout the permeable body and an electric current can be passed through the conductive material sufficient to generate heat. The electrically conductive material can include, but is not limited to, metal pieces or beads, conductive cement, metal coated particles, metal-ceramic composites, conductive semi-metal carbides, calcined petroleum coke, laid wire, combinations of these materials, and the like. The electrically conductive material can be premixed having various mesh sizes or the materials can be introduced into the permeable body subsequent to formation of the permeable body.

Liquids or gases can transfer heat from heat source 134, or in another embodiment, in the cases of hydrocarbon liquid or gas combustion, radio frequency generators (microwaves), or fuel cells all can, but need not, actually generate heat inside of capsule impoundment area 114 or 122. In one embodiment, heating of the permeable body can be accomplished by convective heating from hydrocarbon combustion. Of particular interest is hydrocarbon combustion performed under stoichiometric conditions of fuel to oxygen. Stoichiometric conditions can allow for significantly increased heat gas temperatures. Stoichiometric combustion can employ but does not generally require a pure oxygen source which can be provided by known technologies including, but not limited to, oxygen concentrators, membranes, electrolysis, and the like. In some embodiments oxygen can be provided from air with stoichiometric amounts of oxygen and hydrogen. Combustion off gas can be directed to an ultra-high temperature heat exchanger, e.g. a ceramic or other suitable material having an operating temperature above about 2500° F. Air obtained from ambient or recycled from other processes can be heated via the ultra high temperature heat exchanger and then sent to the impoundment for heating of the permeable body. The combustion off gases can then be sequestered without the need for further separation, i.e. because the off gas is predominantly carbon dioxide and water.

In order to minimize heat losses, distances can be minimized between the combustion chamber, heat exchanger, and impoundments. Therefore, in one specific detailed embodiment portable combustors can be attached to individual heating conduits or smaller sections of conduits. Portable combustors or burners can individually provide from about 100,000 Btu to about 1,000,000 Btu with about 600,000 Btu per pipe generally being sufficient.

Alternatively, in-capsule combustion can be initiated inside of isolated capsules within a primary constructed capsule containment structure. This process partially combusts hydrocarbonaceous material to provide heat and intrinsic pyrolysis. Unwanted air emissions 144 can be captured and sequestered in a formation 108 once derived from capsule containment 114, 122 or from heat source 134 and delivered by a drilled well bore 142. Heat source 134 can also create electricity and transmit, transform or power via electrical transmission lines 150. The liquids or gases extracted from capsule impoundment treatment area 114 or 122 can be stored in a nearby holding tank 136 or within a capsule containment 114 or 122. For example, the impermeable floor layer 112 can include a sloped area 110 which directs liquids towards drain system 133 where liquids are directed to the holding tank.

As rubble material 120 is placed with piping 118, 124, 126, and 128, various measurement devices or sensors 130 are envisioned to monitor temperature, pressure, fluids, gases, compositions, heating rates, density, and all other process attributes during the extractive process within, around, or underneath the engineered capsule containment impoundment 100. Such monitoring devices and sensors 130 can be distributed anywhere within, around, part of, connected to, or on top of placed piping 118, 124, 126, and 128 or, on top of, covered by, or buried within rubble material 120 or impermeable barrier zone 112.

As placed rubble material 120 fills the capsule treatment area 114 or 122, 120 becomes the ceiling support for engineered impermeable cap barrier zone 138, and wall barrier construction 170, which may include any combination of impermeability and engineered fluid and gas barrier or constructed capsule construction comprising those which may make up 112 including, but not limited to clay 162, compacted fill or import material 164, cement or refractory cement containing material 166, geo synthetic membrane, liner or insulation 168. Above 138, fill material which can be oriented as ceiling cap 116 is placed to create lithostatic pressure upon the capsule treatment areas 114 or 122. Covering the permeable body with compacted fill sufficient to create an increased lithostatic pressure within the permeable body can be useful in further increasing hydrocarbon product quality. A compacted fill ceiling can substantially cover the permeable body, while the permeable body in return can substantially support the compacted fill ceiling. The compacted fill ceiling can further be sufficiently impermeable to removed hydrocarbon or an additional layer of permeability control material can be added in a similar manner as side and/or floor walls. Additional pressure can be introduced into extraction capsule treatment area 114 or 122 by increasing any gas or fluid once extracted, treated or recycled, as the case may be, via any of piping 118, 124, 126, or 128. All relative measurements, optimization rates, injection rates, extraction rates, temperatures, heating rates, flow rates, pressure rates, capacity indicators, chemical compositions, or other data relative to the process of heating, extraction, stabilization, sequestration, impoundment, upgrading, refining or structure analysis within the capsule impoundment 100 are envisioned through connection to a computing device 132 which operates computer software for the management, calculation and optimization of the entire process. Further, core drilling, geological reserve analysis and assay modeling of a formation prior to blasting, mining and hauling (or at any time before, after or during such tasks) can serve as data input feeds into computer controlled mechanisms that operate software to identify optimal placements, dimensions, volumes and designs calibrated and cross referenced to desired production rate, pressure, temperature, heat input rates, gas weight percentages, gas injection compositions, heat capacity, permeability, porosity, chemical and mineral composition, compaction, density. Such analysis and determinations may include other factors like weather data factors such as temperature and air moisture content impacting the overall performance of the constructed infrastructure. Other data such as ore moisture content, hydrocarbon richness, weight, mesh size, and mineral and geological composition can be utilized as inputs including time value of money data sets yielding project cash flows, debt service, and internal rates of return.

Figure 2B:
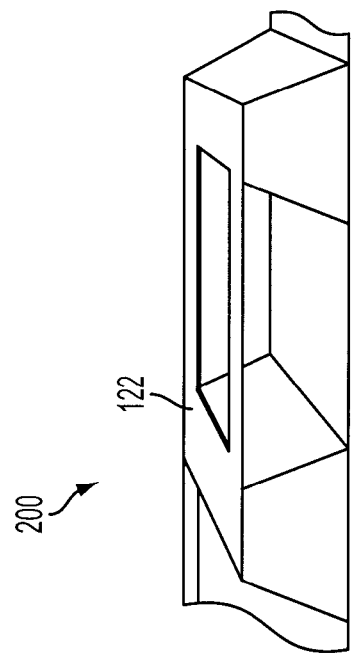
FIGS. 2A and 2B are top and plan views of a plurality of permeability control impoundments in accordance with one embodiment.
Figure 2A:
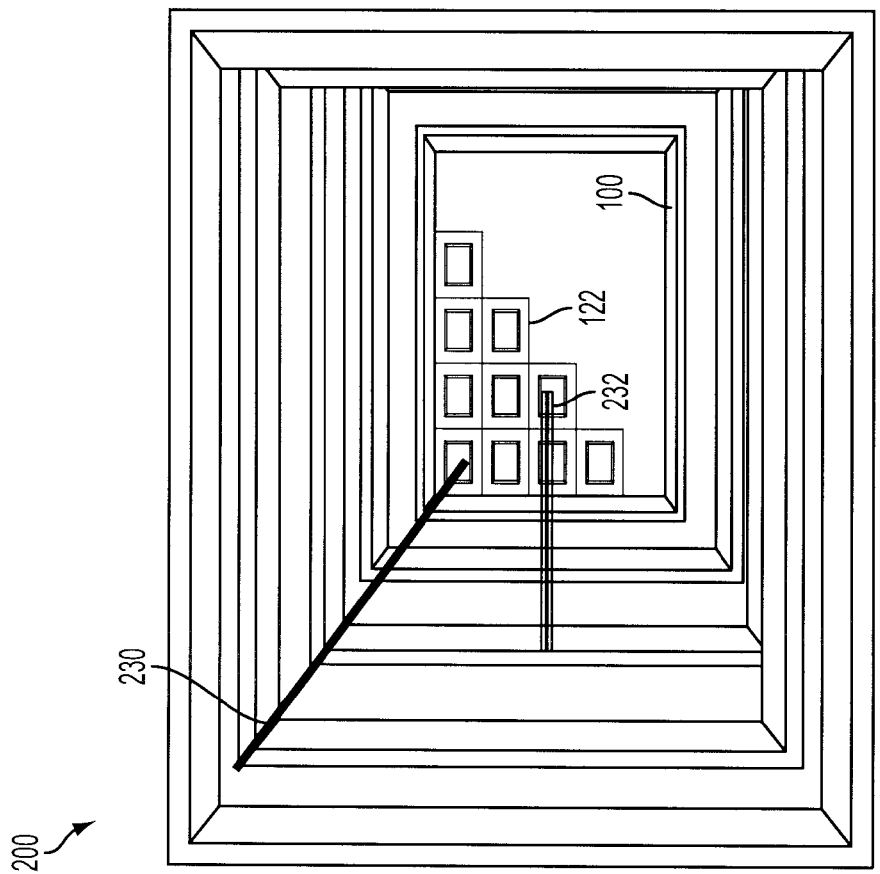

FIG. 2A shows a collection of impoundments including an uncovered or uncapped capsule impoundment 100, containing sectioned capsule impoundments 122 inside of a mining quarry 200 with various elevations of bench mining. FIG. 2B illustrates a single impoundment 122 without associated conduits and other aspects merely for clarity. This impoundment can be similar to that illustrated in FIG. 1 or any other configuration. In some embodiments, it is envisioned that mining rubble can be transferred down chutes 230 or via conveyors 232 to the quarry capsule impoundments 100 and 122 without any need of mining haul trucks.

Figure 3:
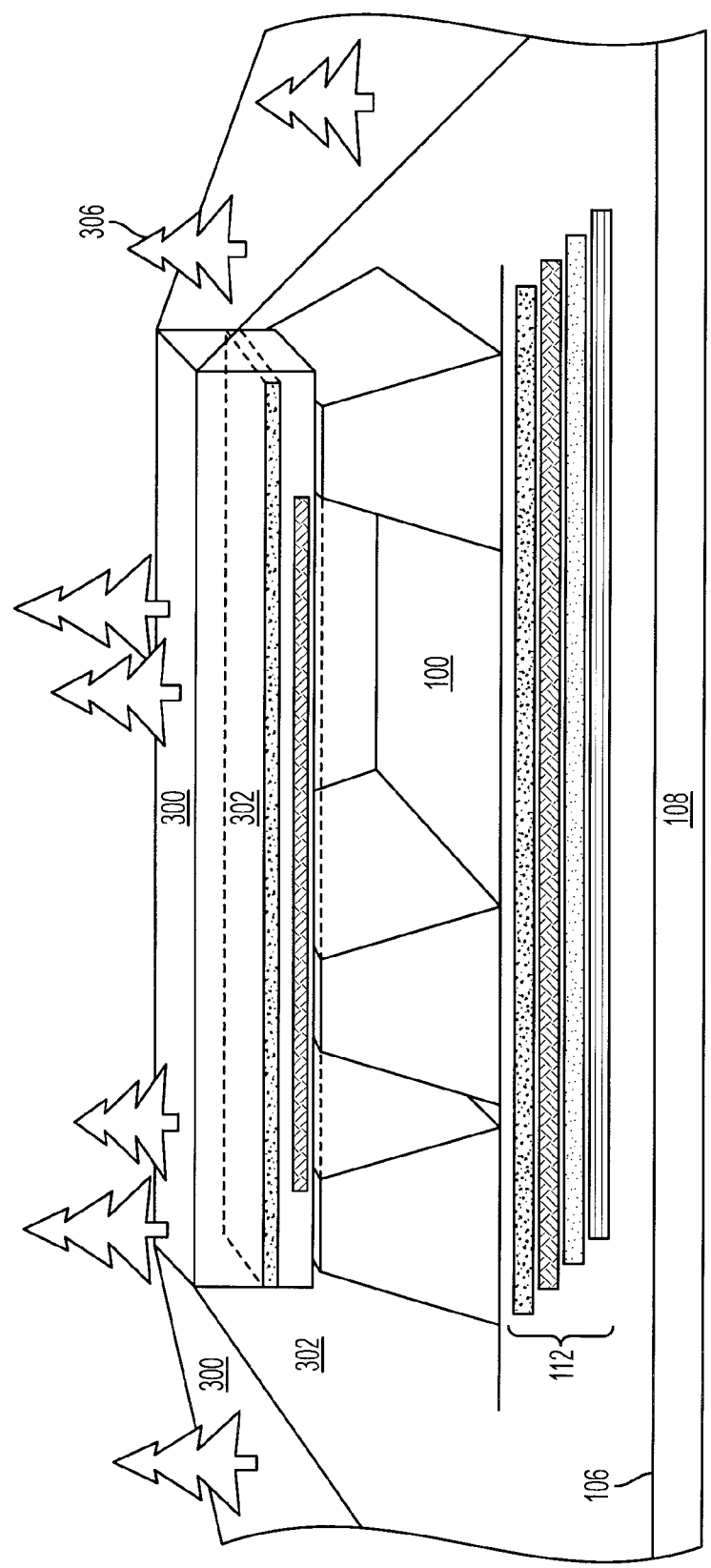
FIG. 3 is a side cutaway view of a permeability control impoundment in accordance with one embodiment.

FIG. 3 shows the engineered permeability barriers 112 below capsule impoundment 100 resting on existing grade 106 of formation 108 with cap covering material or fill 302 on the sides and top of capsule impoundment 100 to ultimately (following the process) cover and reclaim a new earth surface 300. Indigenous plants which may have been temporarily moved from the area may be replanted such as trees 306. The constructed infrastructures can generally be single use structures which can be readily and securely shut down with minimal additional remediation. This can dramatically reduce costs associated with moving large volumes of spent materials. However, in some circumstances the constructed infrastructures can be excavated and reused. Some equipment such as radio frequency (RF) mechanisms, tubulars, devices, and emitters may be recovered from within the constructed impoundment upon completion of hydrocarbon recovery.

Figure 4:
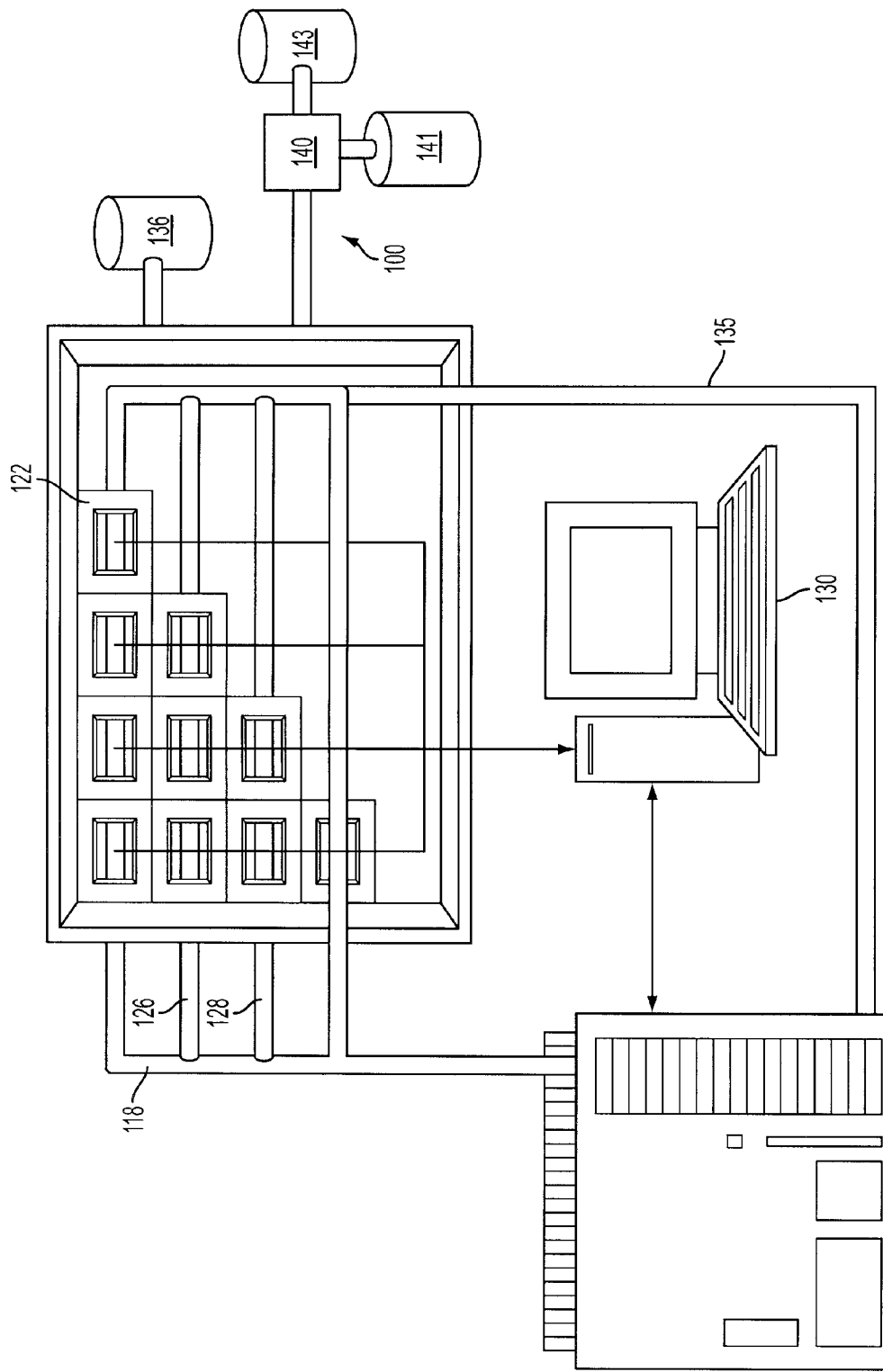
FIG. 4 is a schematic of a portion of a constructed infrastructure in accordance with an embodiment.

FIG. 4 shows computer means 130 controlling various property inputs and outputs of conduits 118, 126, or 128 connected to heat source 134 during the process among the subdivided impoundments 122 within a collective impoundment 100 to control heating of the permeable body. Similarly, liquid and vapor collected from the impoundments can be monitored and collected in tank 136 and condenser 140, respectively. Condensed liquids from the condenser can be collected in tank 141, while non-condensable vapor collected at unit 143. As described previously, the liquid and vapor products can be combined or more often left as separate products depending on condensability, target product, and the like. A portion of the vapor product can be optionally condensed and combined with the liquid products in tank 136. However, much of the vapor product will be C4 and lighter gases which can be burned, sold, or used within the process. For example, hydrogen gas may be recovered using conventional gas separation and used to hydrotreat the liquid products according to conventional upgrading methods, e.g. catalytic, etc. or the non-condensable gaseous product can be burned to produce heat for use in heating the permeable body, heating an adjacent or nearby impoundment, heating service or personnel areas, or satisfying other process heat requirements. The constructed infrastructure can include thermocouples, pressure meters, flow meters, fluid dispersion sensors, richness sensors and any other conventional process control devices distributed throughout the constructed infrastructure. These devices can be each operatively associated with a computer such that heating rates, product flow rates, and pressures can be monitored or altered during heating of the permeable body. Optionally, in-place agitation can be performed using, for example, ultrasonic generators which are associated with the permeable body. Such agitation can facilitate separation and pyrolysis of hydrocarbons from the underlying solid materials with which they are associated. Further, sufficient agitation can reduce clogging and agglomeration throughout the permeable body and the conduits.

Figure 5:
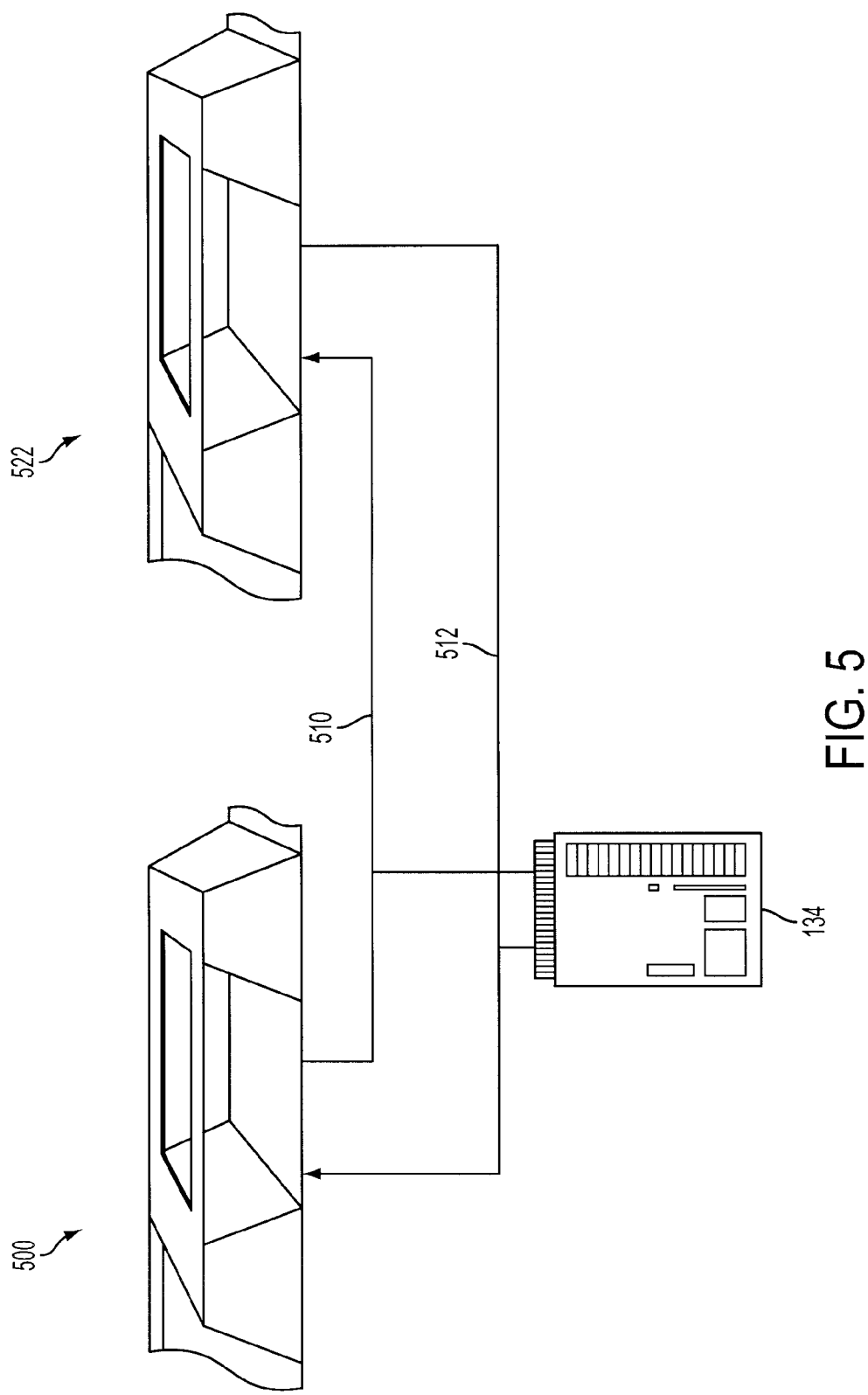
FIG. 5 is a schematic showing heat transfer between two permeability control impoundments in accordance with another embodiment.

FIG. 5 shows how any of the conduits can be used to transfer heat in any form of gas, liquid or heat via transfer means 510 from any sectioned capsule impoundment to another. Then, cooled fluid can be conveyed via heat transfer means 512 to the heat originating capsule 500, or heat originating source 134 to pick up more heat from capsule 500 to be again recirculated to a destination capsule 522. Thus, various conduits can be used to transfer heat from one impoundment to another in order to recycle heat and manage energy usage to minimize energy losses.

In yet another aspect, a hydrogen donor agent can be introduced into the permeable body during the step of heating. The hydrogen donor agent can be any composition which is capable of hydrogenation of the hydrocarbons and can optionally be a reducing agent. Non-limiting examples of suitable hydrogen donor agents can include synthesis gas, propane, methane, hydrogen, natural gas, natural gas condensate, industrial solvents such as acetones, toluenes, benzenes, xylenes, cumenes, cyclopentanes, cyclohexanes, lower alkenes (C4-C10), terpenes, substituted compounds of these solvents, etc., and the like. Further, the recovered hydrocarbons can be subjected to hydrotreating either within the permeable body or subsequent to collection. Advantageously, hydrogen recovered from the gas products can be reintroduced into the liquid product for upgrading. Regardless, hydrotreating or hydrodesulfurization can be very useful in reducing nitrogen and sulfur content in final hydrocarbon products. Optionally, catalysts can be introduced to facilitate such reactions. In addition, introduction of light hydrocarbons into the permeable body can result in reforming reactions which reduce the molecular weight, while increasing the hydrogen to carbon ratio. This is particularly advantageous due at least in part to high permeability of the permeable body, e.g. often around 30%-40% void volume although void volume can generally vary from about 10% to about 50% void volume. Light hydrocarbons which can be injected can be any which provide reforming to recovered hydrocarbons. Non-limiting examples of suitable light hydrocarbons include natural gas, natural gas condensates, industrial solvents, hydrogen donor agents, and other hydrocarbons having ten or fewer carbons, and often five or fewer carbons. Currently, natural gas is an effective, convenient, and plentiful light hydrocarbon. As mentioned previously, various solvents or other additives can also be added to aid in extraction of hydrocarbon products from the oil shale and can often also increase fluidity.

The light hydrocarbon can be introduced into the permeable body by conveying the same through a delivery conduit having an open end in fluid communication with a lower portion of the permeable body such that the light hydrocarbons (which are a gas under normal operating conditions) permeate up through the permeable body. Alternatively, this same approach can be applied to recovered hydrocarbons which are first delivered to an empty impoundment. In this way, the impoundment can act as a holding tank for direct products from a nearby impoundment and as a reformer or upgrader. In this embodiment, the impoundment can be at least partially filled with a liquid product where the gaseous light hydrocarbon is passed through and allowed to contact the liquid hydrocarbon products at temperatures and conditions sufficient to achieve reforming in accordance with well known processes. Optional reforming catalysts which include metals such as Pd, Ni or other suitable catalytically active metals can also be included in the liquid product within the impoundment. The addition of catalysts can serve to lower and/or adjust reforming temperature and/or pressure for particular liquid products. Further, the impoundments can be readily formed at almost any depth. Thus, optimal reforming pressures (or recovery pressures when using impoundment depth as pressure control measure for recovery from a permeable body) can be designed based on hydrostatic pressure due to the amount of liquid in the impoundment and the height of the impoundment, i.e. $P=\rho g h$. In addition, the pressure can vary considerably over the height of the impoundment sufficient to provide multiple reforming zones and tailorable pressures. Generally, pressures within the permeable body can be sufficient to achieve substantially only liquid extraction, although some minor volumes of vapor may be produced depending on the particular composition of the permeable body. As a general guideline, pressures can range from about 5 atm to about 50 atm, although pressures from about 6 atm to about 20 atm can be particularly useful. However, any pressure greater than about atmospheric can be used.

In one embodiment, extracted crude has fines precipitated out within the subdivided capsules. Extracted fluids and gases can be treated for the removal of fines and dust particles. Separation of fines from shale oil can be accomplished by techniques such as, but not limited to, hot gas filtering, precipitation, and heavy oil recycling.

Hydrocarbon products recovered from the permeable body can be further processed (e.g. refined) or used as produced. Any condensable gaseous products can be condensed by cooling and collection, while non-condensable gases can be collected, burned as fuel, reinjected, or otherwise utilized or disposed of. Optionally, mobile equipment can be used to collect gases. These units can be readily oriented proximate to the control infrastructure and the gaseous product directed thereto via suitable conduits from an upper region of the control infrastructure.

In yet another alternative embodiment, heat within the permeable body can be recovered subsequent to primary recovery of hydrocarbon materials therefrom. For example, a large amount of heat is retained in the permeable body. In one optional embodiment, the permeable body can be flooded with a heat transfer fluid such as water to form a heated fluid, e.g. heated water and/or steam. At the same time, this process can facilitate removal of some residual hydrocarbon products via a physical rinsing of the spent shale solids. In some cases, the introduction of water and presence of steam can result in water gas shift reactions and formation of synthesis gas. Steam recovered from this process can be used to drive a generator, directed to another nearby infrastructure, or otherwise used. Hydrocarbons and/or synthesis gas can be separated from the steam or heated fluid by conventional methods.

Although the methods and infrastructure allow for improved permeability and control of operating conditions, significant quantities of unrecovered hydrocarbons, precious metals, minerals, sodium bicarbonate or other commercially valuable materials often remain in the permeable body. Therefore, a selective solvent can be injected or introduced into the permeable body. Typically, this can be done subsequent to collecting the hydrocarbons, although certain selective solvents can be beneficially used prior to heating and/or collection. This can be done using one or more of the existing conduits or by direct injection and percolation through the permeable body. The selective solvent or leachate can be chosen as a solvent for one or more target materials, e.g. minerals, precious metal, heavy metals, hydrocarbons, or sodium bicarbonate. In one specific embodiment, steam or carbon dioxide can be used as a rinse of the permeable body to dislodge at least a portion of any remaining hydrocarbons. This can be beneficial not only in removing potentially valuable secondary products, but also in cleaning remaining spent materials of trace heavy metal or inorganics to below detectable levels in order to comply with regulatory standards or to prevent inadvertent leaching of materials at a future date.

More particularly, various recovery steps can be used either before or after heating of the permeable body to recover heavy metals, precious metals, trace metals or other materials which either have economic value or may cause undesirable problems during heating of the permeable body. Typically, such recovery of materials can be performed prior to heat treatment of the permeable body. Recovery steps can include, but are in no way limited to, solution mining, leaching, solvent recovery, precipitation, acids (e.g. hydrochloric, acidic halides, etc.), flotation, ionic resin exchange, electroplating, or the like. For example, heavy metals, bauxite or aluminum, and mercury can be removed by flooding the permeable body with an appropriate solvent and recirculating the resulting leachate through appropriately designed ion exchange resins (e.g. beads, membranes, etc.).

Similarly, bioextraction, bioleaching, biorecovery, or bioremediation of hydrocarbon material, spent materials, or precious metals can be performed to further improve remediation, extract valuable metals, and restoration of spent material to environmentally acceptable standards. In such bioextraction scenarios, conduits can be used to inject catalyzing gases as a precursor which helps to encourage bioreaction and growth. Such microorganisms and enzymes can biochemically oxidize the ore body or material or cellulosic or other biomass material prior to an ore solvent extraction via bio-oxidation. For example, a perforated pipe or other mechanism can be used to inject a light hydrocarbon (e.g. methane, ethane, propane or butane) into the permeable body sufficient to stimulate growth and action of native bacteria. Bacteria can be native or introduced and may grow under aerobic or anaerobic conditions. Such bacteria can release metals from the permeable body which can then be recovered via flushing with a suitable solvent or other suitable recovery methods. The recovered metals can then be precipitated out using conventional methods.

Synthesis gas can also be recovered from the permeable body during the step of heating. Various stages of gas production can be manipulated through processes which raise or lower operating temperatures within the encapsulated volume and adjust other inputs into the impoundment to produce synthetic gases which can include but are not limited to, carbon monoxide, hydrogen, hydrogen sulfide, hydrocarbons, ammonia, water, nitrogen or various combinations thereof. In one embodiment, temperature and pressure can be controlled within the permeable body to lower $CO_2$ emissions as synthetic gases are extracted.

Hydrocarbon product recovered from the constructed infrastructures can most often be further processed, e.g. by upgrading, refining, etc. Sulfur from related upgrading and refining processing can be isolated in various constructed sulfur capsules within the greater structured impoundment capsule. Constructed sulfur capsules can be spent constructed infrastructures or dedicated for the purpose of storage and isolation after desulfurization.

Similarly, spent hydrocarbonaceous material remaining in the constructed infrastructure can be utilized in the production of cement and aggregate products for use in construction or stabilization of the infrastructure itself or in the formation of offsite constructed infrastructures. Such cement products made with the spent shale may include, but are not limited to, mixtures with Portland cement, calcium salt, volcanic ash, perlite, synthetic nano carbons, sand, fiber glass, crushed glass, asphalt, tar, binding resins, cellulosic plant fibers, and the like.

In still another embodiment, injection, monitoring and production conduits or extraction egresses can be incorporated into any pattern or placement within the constructed infrastructure. Monitoring wells and constructed geo membrane layers beneath or outside of the constructed capsule containment can be employed to monitor unwanted fluid and moisture migration outside of containment boundaries and the constructed infrastructure.

Although a filled and prepared constructed infrastructure can often be immediately heated to recover hydrocarbons, this is not required. For example, a constructed infrastructure which is built and filled with mined hydrocarbonaceous material can be left in place as a proven reserve. Such structures are less susceptible to explosion or damage due to terrorist activity and can also provide strategic reserves of unprocessed petroleum products, with classified and known properties so that economic valuations can be increased and more predictable. Long term petroleum storage often faces quality deterioration issues over time. Thus, these approaches can optionally be used for long term quality insurance and storage with reduced concerns regarding breakdown and degradation of hydrocarbon products.

In still another aspect, the high quality liquid product can be blended with more viscous lower quality (e.g. lower API) hydrocarbon products. For example, kerogen oil produced from the impoundments can be blended with bitumen to form a blended oil. The bitumen is typically not transportable through an extended pipeline under conventional and accepted pipeline standards and can have a viscosity substantially above and an API substantially below that of the kerogen oil. By blending the kerogen oil and bitumen, the blended oil can be rendered transportable without the use of additional diluents or other viscosity or API modifiers. As a result, the blended oil can be pumped through a pipeline without requiring additional treatments to remove a diluent or returning such diluents via a secondary pipeline. Conventionally, bitumen is combined with a diluent such as natural gas condensate or other low molecular weight liquids, to allow pumping to a remote location. The diluent is removed and returned via a second pipeline back to the bitumen source. These approaches allow for elimination of returning diluent and simultaneous upgrading of the bitumen.

Difficult problems can thus be solved related to the extraction of hydrocarbon liquids and gases from surface or underground mined hydrocarbon bearing deposits such as oil shale, tar sands, lignite, and coal, and from harvested biomass. Among other things, these methods and systems help reduce cost, increase volume output, lower air emissions, limit water consumption, prevent underground aquifer contamination, reclaim surface disturbances, reduce material handling costs, remove dirty fine particulates, and improve composition of recovered hydrocarbon liquid or gas. Water contamination issues can also be addressed with a safer, more predictable, engineered, observable, repairable, adaptable and preventable water protection structure.

Although the described methods and systems are mining-dependent, they are not limited or encumbered to conventional aboveground (ex-situ) retorting processes. This approach improves upon the benefits of surface retorts including better process control of temperature, pressure, injection rates, fluid and gas compositions, product quality and better permeability due to processing and heating mined rubble. These advantages are available while still addressing the volume, handling, and scalability issues most fabricated surface retorts cannot provide.

Other improvements which can be realized are related to environmental protection. Conventional surface retorts have had the problem of spent shale after it has been mined and has passed through a surface retort. Spent shale which has been thermally altered requires special handling to reclaim and isolate from surface drainage basins and underground aquifers. These methods and systems can address reclamation and retorting in a uniquely combined approach. In regards to air emissions which are also a major problem typical of prior surface retort methods, this approach, because of its enormous volume capacity and high permeability, can accommodate longer heating residence times and therefore lower temperatures. One benefit of lower temperatures in the extraction process is that carbon dioxide production from decomposition of carbonates in the oil shale ore can be substantially limited thereby dramatically reducing $CO_2$ emissions and atmospheric pollutants.

It is to be understood that the above-referenced arrangements are illustrative of the application for the principles of the present invention. Thus, while the present invention has been described above in connection with the exemplary embodiments, it will be apparent to those of ordinary skill in the art that numerous modifications and alternative arrangements can be made without departing from the principles and concepts of the invention as set forth in the claims.

What is claimed is:

1. A method of sequestering carbon dioxide emissions during recovery of hydrocarbons from hydrocarbonaceous materials comprising:

a) forming a constructed permeability control infrastructure which defines a substantially encapsulated volume, said infrastructure comprising clay, bentonite clay, bentonite amended soil, compacted fill, refractory cement, cement, synthetic geogrids, fiberglass, rebar, nanocarbon fullerene additives, filled geotextile bags, polymeric resins, oil resistant PVC liners, engineered cementitious composites (ECC), fiber reinforced composites, geosynthetic fabrics, sealant, grout, compacted earth, low grade shale, or combinations thereof, wherein the control infrastructure is formed in direct contact with walls of an excavated hydrocarbonaceous material deposit or is freestanding having either a foundation support of earthen material or a local surface topography as a floor;

b) introducing a comminuted hydrocarbonaceous material into the control infrastructure to form a permeable body of hydrocarbonaceous material;

c) heating the permeable body sufficient to remove hydrocarbons therefrom such that the hydrocarbonaceous material is substantially stationary during heating;

d) sequestering carbon dioxide produced during the heating; and e) collecting the removed hydrocarbons.

2. The method of claim 1, wherein sequestering carbon dioxide is achieved by reacting carbon dioxide with an aqueous solution to form a precipitation of carbon dioxide with a metal.

3. The method of claim 2, wherein the metal is selected from the group consisting of calcium, magnesium, oxides thereof, silicates thereof, and mixtures thereof.

4. The method of claim 2, wherein the aqueous solution is salt water.

5. The method of claim 1, wherein sequestering carbon dioxide is achieved by injecting exhausted hydro carbonaceous materials with the carbon dioxide and salt water.

6. The method of claim 1, wherein sequestering carbon dioxide is achieved by cryogenic precipitation forming liquid carbon dioxide.

7. The method of claim 6, wherein the liquid carbon dioxide is mixed with exhausted hydrocarbonaceous materials.

8. The method of claim 1, wherein sequestering carbon dioxide is achieved by injecting exhausted hydrocarbonaceous materials with the carbon dioxide.

9. The method of claim 8, wherein the injecting is performed with a catalyst.

10. The method of claim 1, wherein the step of heating includes injecting heated gases into the control infrastructure such that the permeable body is primarily heated via convection as the heated gases pass throughout the permeable body.

11. The method of claim 1, wherein the permeable body further comprises a plurality of conduits embedded within the permeable body, at least some of said conduits being configured as heating pipes.

12. The method of claim 1, wherein the infrastructure comprises clay, bentonite clay, bentonite amended soil, compacted fill, compacted earth, low grade shale, or combinations thereof.

* * * * *